3,493,377
TWO-COMPONENT DIAZOTYPE MATERIAL
Herbert Rauhut and Hans-Dieter Dotsch, Wiesbaden-Biebrich, Germany, assignors, by mesne assignments, to Keuffel & Esser Company, Morristown, N.J.
No Drawing. Filed Apr. 25, 1967, Ser. No. 633,376
Claims priority, application Germany, Apr. 27, 1966, K 59,101
Int. Cl. G03c 1/58
U.S. Cl. 96—91                    7 Claims

ABSTRACT OF THE DISCLOSURE

Diazotype material capable of providing a more neutral blue dye shade is prepared with a unilaterally diazotized p-phenylene diamine diazonium component and an azo coupler component which is a 2-hydroxy-3-naphthoic acid anilide derivative of the general formula:

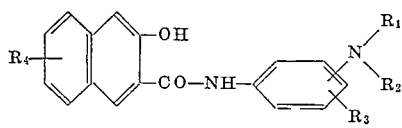

wherein $R_1$ stands for H a lower alkyl group, or a lower hydroxyalkyl group, $R_2$ stands for a lower alkyl groups or a lower hydroxyalkyl group, or $R_1$ and $R_2$ form a 5 or 6-membered heterocyclic ring with the nitrogen atom to which they are attached, $R_3$ stands for H a lower alkyl group, a lower alkoxy group, or halogen, and $R_4$ stands for H halogen, or a lower alkoxy group, the group

being either in this form, or in the form of a salt or a quaternized ammonium compound.

BACKGROUND OF THE INVENTION

Light-sensitive diazo compounds, generally such which are derived from N,N-disubstituted p-phenylene diamine, and coupling components which are capable of reacting with these diazo compounds to form intensively colored, stable azo dyestuffs, have been used for the preparation of diazotype material. In a two-component diazotype material, both reactants, i.e. the diazo compound and the coupling component, are present in the light-sensitive layer of the material. By varying the structure both of the diazo compound and of the coupling component, a large number of different color shades have been produced. Thus, it is known that blue color shades are obtained by using the above mentioned diazo compounds in combination with derivatives of 2-hydroxy-3-naphthoic acid amide as the coupling or blue component. The blue color shades obtained normally display a red tinge.

For certain purposes, however, e.g. when black color shades are to be produced in combination with suitable yellow components, or when so-called color-proofing foils, which should as far as possible resemble a standard blue, e.g., DIN16508, are to be prepared, e.g. on a cellulose acetate film as the support, neutral blue to greenish-blue color shades are desired.

The 2-hydroxy-3-naphthoic acid anilide known, e.g., to be suitable as a blue component has the further disadvantage that it can not be used in aqueous coating solutions due to its poor solubility. The corresponding compounds containing one or two phenolic hydroxy groups in the benzene nucleus of the aniline radical effect a certain shift of the color shades towards greenish-blue, but this technical improvement is not sufficient for the purposes mentioned above. The solubility of these compounds, too, is insufficient for many purposes. They may be capable of dissolution in coating solutions containing approximately 50 percent of alcohol, such as are used in some cases for diffusion sensibilization of acetate films. Coating solutions of this type, however, are not suitable for coating photo-printing base paper, because the alcoholic solution may penetrate to the back of the paper and thus cause blotting.

Further, water-soluble derivatives of 2-hydroxy-3-naphthoic acid amide are also known as blue-coupling components, e.g. 2-hydroxy-3-naphthoic acid-($\beta$-aminoethyl)-amide or 2-hydroxy-3-naphthoic acid-($\beta$-hydroxyethyl)-amide. However, the azo dye-stuffs produced with these couplers are also of a reddish blue.

SUMMARY OF THE INVENTION

According to the present invention, a two-component diazo-type material is prepared comprising a support and a light-sensitive layer thereon which contains at least one diazo compound of the unilaterally diazotized substituted p-phenyl diamine type and at least one coupling component of the general formula:

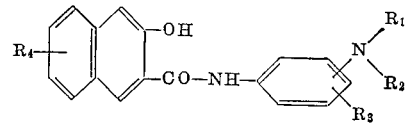

wherein:

$R_1$ stands for H, a lower alkyl group, or a lower hydroxyalkyl group.

$R_2$ stands for a lower alkyl group or a lower hydroxy alkyl group, or $R_1$ and $R_2$ form a 5- or 6-membered heterocyclic ring with the nitrogen atom to which they are attached, $R_3$ stands for H, a lower alkyl group, a lower alkoxy group, or halogen, and $R_4$ stands for H, halogen, or a lower alkoxy group, the grouping

being either in this form or in the form of a salt or a quaternary ammonium compound.

The term "lower" alkyl, hydroxyalkyl and alkoxy groups means such groups which contain up to 4 carbon atoms. When $R_4$ stands for an alkoxy group, it is preferably a methoxy group, because of its easier preparation. An alkoxy group in the naphthalene nucleus has the advantage that it displaces the color shade of the prints obtained still further towards the greenish-blue.

Formation of a salt at the amino group may be effected in known manner using any acid capable of forming stable amine salts. As usual, the hydrochlorides are preferred for the sake of simplicity.

When the amino group is quaternized, the fourth organic radical is preferably a lower alkyl or alkenyl group, because longer chains impair the solubility of the compound or may even cause a crosslinking effect.

When $R_1$ and $R_2$ form a heterocyclic radical with the nitrogen atom, pyrrolidine, morpholine or piperidene radicals are preferred as heterocyclic radicals.

Any customary support may be used as supporting material for the light-sensitive layers according to the invention. Transparent paper, transparentized paper, paper having a coating of cellulose acetate and cellulose acetate film or plastic film, the latter, if desired, after a hydrophilizing pre-treatment, are preferably used.

The diazonium compounds to be used in combination with the coupling components of the invention for the preparation of blue color shades are known. They are derivatives of the unilaterally diazotized p-phenylene diamine having one or two, normally two, substituents, e.g. alkyl or hydroxyalkyl groups, in the amino group.

In combination with the diazo compounds mentioned, the coupling components provided by the present invention yield neutral blue to greenish blue azo dyestuffs such as have never before been obtained by any of the known blue-coupling components. Furthermore, the new coupling components have the advantage over many of the known blue-coupling components that they are more readily soluble in water. They are adequately soluble in the normal weakly acid aqueous solutions and easily soluble in aqueous-alcoholic solutions. They may, therefore, also be used for coating photoprinting papers, although their principal field of application is in the sensitizing of films.

The blue-coupling components of the present invention may, if desired, be used in admixture with one another, or, if the production of other color shades is desired, in admixture with coupling components producing other color shades.

The new coupling components may be prepared easily. For instance, the substituted or unsubstitued 2-hydroxy-3-naphthoic acid chloride may be reacted with an appropriate base in a suitable solvent, e.g. a chlorinated hydrocarbon, at elevated temperature. Alternatively, the substituted naphthoic acid may be reacted with the amino compound in the presence of thionyl chloride.

The coupling components contain a basic amino group which is capable of forming a salt. They may, therefore, be precipitated as salts by means of acids. Further, the tertiary amino group may be quaternized. For this purpose, the tertiary amino compound is suitably dissolved in dimethylformamide, slightly heated, and then mixed, e.g., with dimethyl sulfate. After some time, the quaternary ammonium compound, in the form of the metosulfate, crystallizes out with high purity. Normally, the quaternary ammonium salts are more readily water-soluble than the corresponding tertiary compounds, so that they are particularly suitable for use in aqueous coating solutions.

I

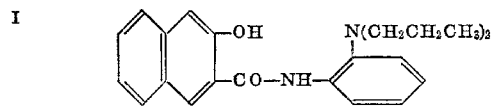

Melting point 114° C. after recrystallization from gasoline

II

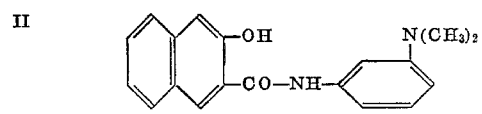

Melting point 186–187° C., after recrystallization from an alcohol water mixture

III

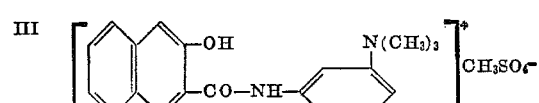

Melting point 254° C. after recrystallization from a methanol, water mixture

IV

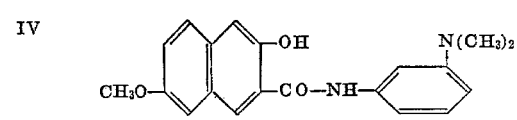

Melting point 198° C., after recrystallization from an alcohol/water mixture

V

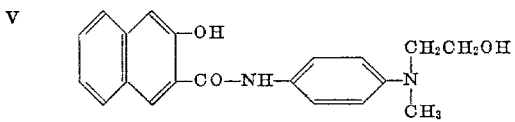

Melting point 191° C., after recrystallization from methanol

VI

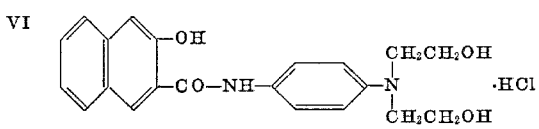

Decomposition point 246° C., after recrystallization from dilute hydrochloric acid

VII

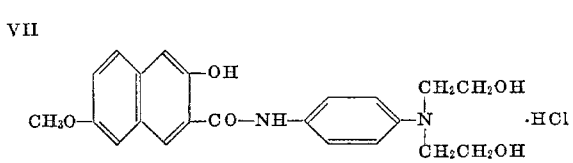

Decomposition point 242° C., after recrystallization from dilute hydrochloric acid

VIII

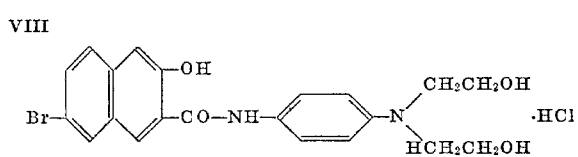

Decomposition point 238° C., after recrystallization from dilute hydrochloric acid

IX

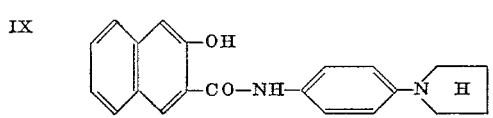

Melting point 163° C., after recrystallization from o-dichlorobenzene

X

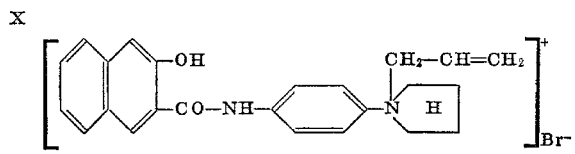

Melting point 179° C.

XI

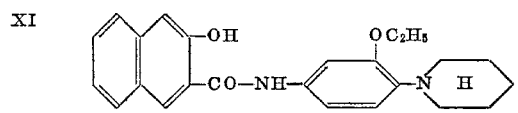

Melting point 172° C. after recrystallization from benzene

XII

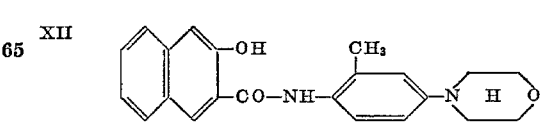

Melting point 219° C. after recrystallization from xylene

PREFERRED EMBODIMENTS

Example 1

A photoprinting base paper of the kind normally used for diazotype purposes, which had been provided with a precoat of colloidal silica and polyvinyl acetate, was coated on the precoated surface with a solution containing:

| | Gm. |
|---|---|
| Citric acid | 4.0 |
| Boric acid | 3.0 |
| Thiourea | 5.0 |
| Aluminum sulfate | 2.0 |
| 2 - hydroxy - 3 - naphthoic acid - 3' - trimethyl - ammonium-anilide, in the form of the metosulfate (Formula III) | 1.8 |
| 4-diazo-N-($\beta$-hydroxy)-ethyl-N-ethyl aniline, in the form of the zinc chloride double salt, in 100 ml. of water | 1.2 |

After drying, the sensitized paper was image-wise exposed under a transparent master and developed with ammonia. Images in a green-tinged blue were obtained.

When the above-mentioned coupling component was replaced by an equimolecular quantity of 2-hydroxy-3-naphthoic acid-($\beta$-amino-ethyl)-amide, which is a known blue-coupling component, blue images with a red tinge were produced under the same conditions.

The compound of Formula II was prepared as follows: 375 gm. of 2-hydroxy-3-naphthoic acid were suspended in 800 ml. of methylene chloride and 5 ml. of pyridine, 160 ml. of thionyl chloride were added to the mixture while agitating, and the mixture was heated. After heating for about one hour with reflux, a clear solution was obtained to which 280 gm. of 3-amino-N,N-dimethyl aniline were drop-wise added after the heating had been switched og.

Stirring was continued for a short time, and then the methylene chloride was evaporated and the residue was dissolved in dilute sodium hydroxide solution. The solution was filtered over active carbon and the filtrate was neutralized to pH-value of 6-7 by adding acetic acid (50%). The precipitate was drawn of by suction, washed with water, and dried.

The yield of 2-hydroxy-3-naphthoic acid-3'-dimethyl-aminoanilide (Formula II) was 565 gm., i.e. 92 percent of the theoretical. The melting point of the crude product was 174° C., of the compound purified by recrystallization from aqueous alcohol 186-187° C.

For the preparation of the quaternary compound (Formula III), 500 gm. of the compound of Formula II were dissolved in 750 ml. of dimethyl formamide and the solution was heated to 90° C. 190 ml. of dimethylsulfate were slowly added, drop by drop, while the mixture was agitated and the temperature rose gradually to 120° C. After a short time, a thick precipitate formed. After the mixture had thoroughly cooled, it was drawn off by suction and the residue was digested with acetone.

The yield was 485 gm., i.e. 69 percent of the theoretical The melting point of the crude product was 245-249° C., of the product after recrystallization from a 1:1 mixture of methanol and water 254° C.

EXAMPLE 2

A cellulose acetate film having an acetyl content of about 55 percent was sensitized by means of the following solution:

| | |
|---|---|
| Citric acid gm | 2.5 |
| Thiourea gm | 6.0 |
| 2 - hydroxy - 3 - naphthoic acid - 4' - (N-piperidino)-3'-ethoxy-anilide (Formula XI) gm | 3.1 |
| 1-diazo-4-diethylamino-3-ethoxybentzene, in the form of the fluoborate gm | 3.0 |
| Formic acid ml | 1.75 |
| Isopropanol ml | 50.0 | made up with water to 100 ml.

The images produced as in Example 1 are greenish-blue.

Results of a similar quality were obtained by replacing the compound of Formula XI by any of the compounds of Formulae I, II, V to X, or XII as the coupling component.

When the coupling components corresponding to Formulae I, II, or V to XII were replaced by an equimolecular quantity of the known blue-coupling component 2-hydroxy-3-naphthoic acid-($\beta$-aminoethyl)-amide, lines in a more red-tinged blue color shade were obtained.

EXAMPLE 3

A support of the kind used in Example 2 was sensitized by means of the following solution:

| | |
|---|---|
| Citric acid gm | 2.5 |
| Thiourea gm | 6.0 |
| 2-hydroxy - 3 - naphthoic acid - 3' - trimethyl - ammonium-anilide, in the form of the metosulfate (Formula III) gm | 4.85 |
| 4-diazo - N,N - diethylaniline, in the form of the fluoborate gm | 4.1 |
| Isopropanol ml | 50.0 |
| Methylethylketone ml | 5.0 |
| Formic acid ml | 1.5 | made up with water to 100 ml.

The images produced as described in Example 1 were of a neutral blue.

When the coupling component according to Formula III was replaced by an equimolecular quantity of 2-hydroxy-3-naphthoic acid-3'-hydroxy-anilide, which is a known blue-coupling component, images in a more red-tinged blue were obtained.

EXAMPLE 4

A support of the kind used in Example 2 was sensitized with the following solution:

| | |
|---|---|
| Citric acid gm | 2.5 |
| Thiourea gm | 6.0 |
| 2-hydroxy - 6 - methoxy - 3 - naphthoic acid - 3' - dimethylamino - anilide (Formula IV) gm | 3.8 |
| 1-diazo-4-(N-morpholino) - 2.5 - diethoxybenzene, in the form of the fluoborate gm | 5.65 |
| Isopropanol ml | 50.0 |
| Methylethylketone ml | 5.0 |
| Formic acid ml | 1.5 | made up with water to 100 ml.

The images produced as described in Example 1 were of a neutral blue color.

When the coupling component of Formula IV was replaced by 2-hydroxy-3-naphthoic acid-2'-hydroxyanilide, images in a blue color shade were obtained which was comparatively red-tinged.

The preparation of the compounds corresponding to Formulae I and IV-XII is analogous to the preparation of the compounds of Formulae II and III described in Example 1.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. Two-component diazotype material comprising a support having a light-sensitive composition thereon, said composition comprising:
   (a) a light-sensitive diazonium compound; and
   (b) an azo coupler compound of the general formula:

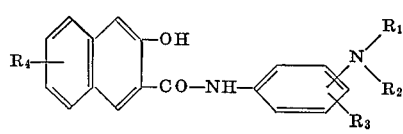

wherein:
R$_1$ stands for H, a lower alkyl group, or a lower hydroxyalkyl group,
R$_2$ stands for a lower alkyl group or a lower hydroxyalkyl group, or
R$_1$ and R$_2$ form a 5- or 6-membered heterocyclic ring with the nitrogen atom to which they are attached,
R$_3$ stand for H, a lower alkyl group, a lower alkoxy group, or halogen, and
R$_4$ stands for H, halogen, or a lower alkoxy group, the grouping

being either in this form, or in the form of a salt or a quaternized ammonium compound.

2. Material according to claim 1 wherein said heterocyclic ring is a pyrrolidine, piperazine or a morpholine radical.

3. Material according to claim 1 wherein said diazonium compound is a unilaterally diazotized p-phenylene diamine derivative.

4. Material according to claim 1 wherein said coupler compound is selected from the group of compounds represented by the following formulae;

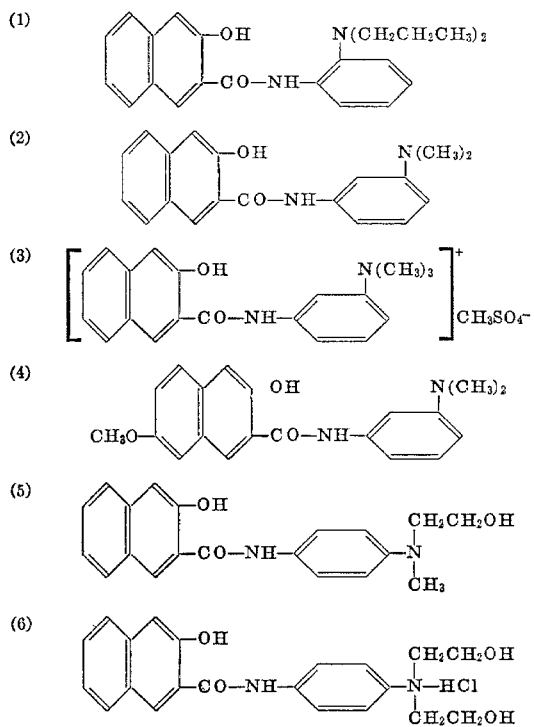

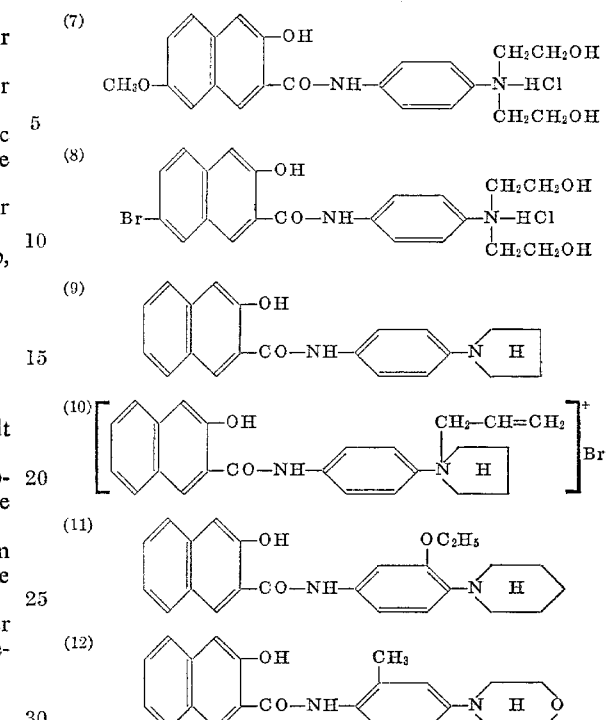

5. Material according to claim 1 wherein said composition is coated on a support.

6. Material according to claim 5 wherein said support is a paper sheet.

7. Material according to claim 5 wherein said support is a transparent plastic film.

References Cited

UNITED STATES PATENTS

| | | | |
|---|---|---|---|
| 1,892,480 | 12/1932 | Bonhote | 260—203 XR |
| 1,947,946 | 2/1934 | Laska et al. | 260—203 XR |
| 2,006,740 | 7/1935 | Krzikalla et al. | 260—560 XR |
| 2,233,038 | 2/1941 | Sus et al. | 96—91 |
| 2,408,421 | 10/1946 | Grimmel et al. | 260—203 XR |
| 3,064,049 | 11/1962 | Cox | 96—91 XR |
| 3,255,010 | 6/1966 | Sus et al. | 96—91 XR |
| 3,404,005 | 10/1968 | Tobey | 96—91 |
| 3,373,021 | 3/1968 | Adams et al. | 96—75 XR |

FOREIGN PATENTS 1,460,145  10/1966  France.

NORMAN G. TORCHIN, Primary Examiner
C. BOWERS, Assistant Examiner

U.S. Cl. X.R.

96—49; 260—203, 560